INVENTOR.
MELFORD E. OLSON
BY
Adams & Cerayna
ATTORNEYS

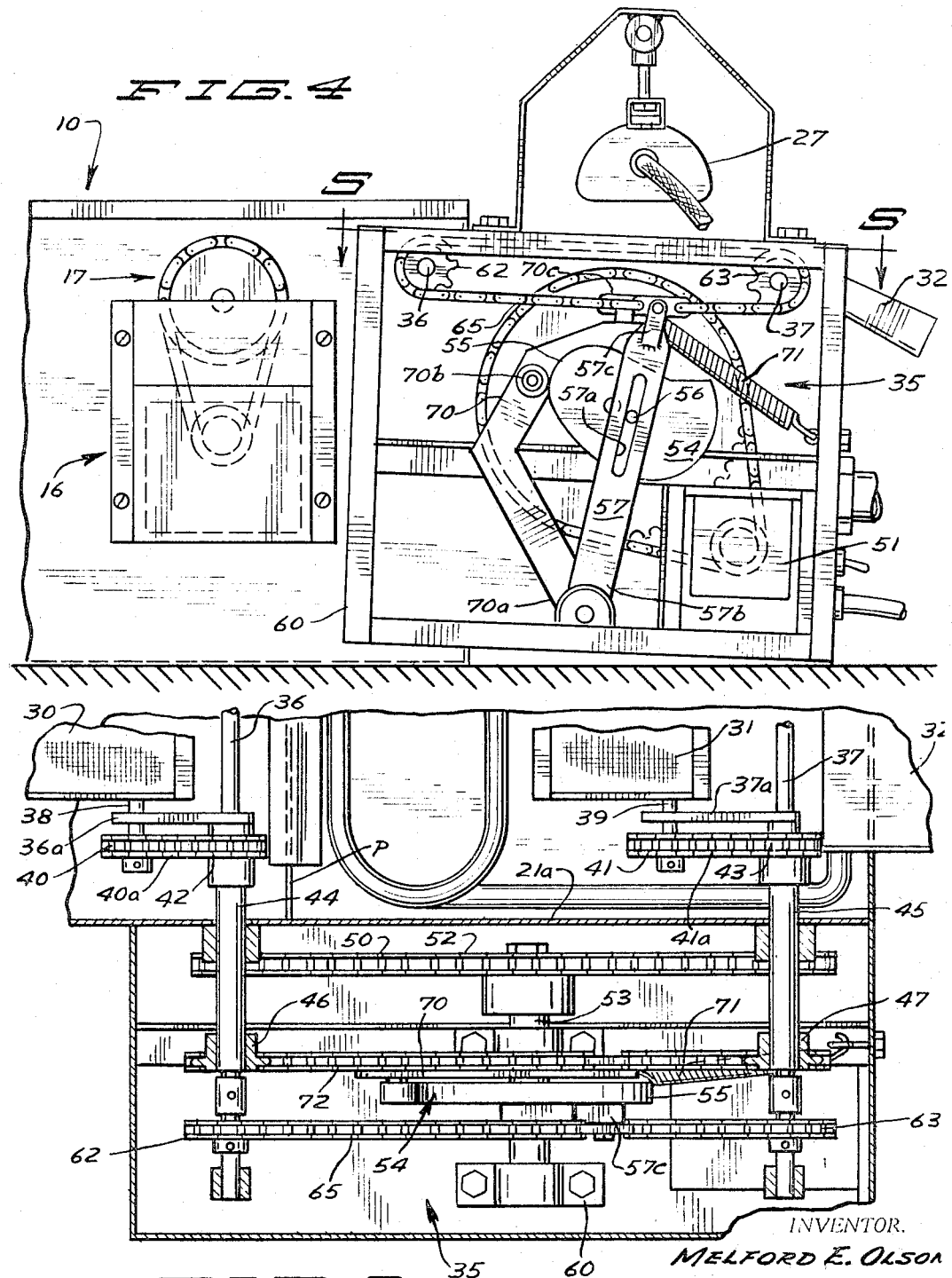

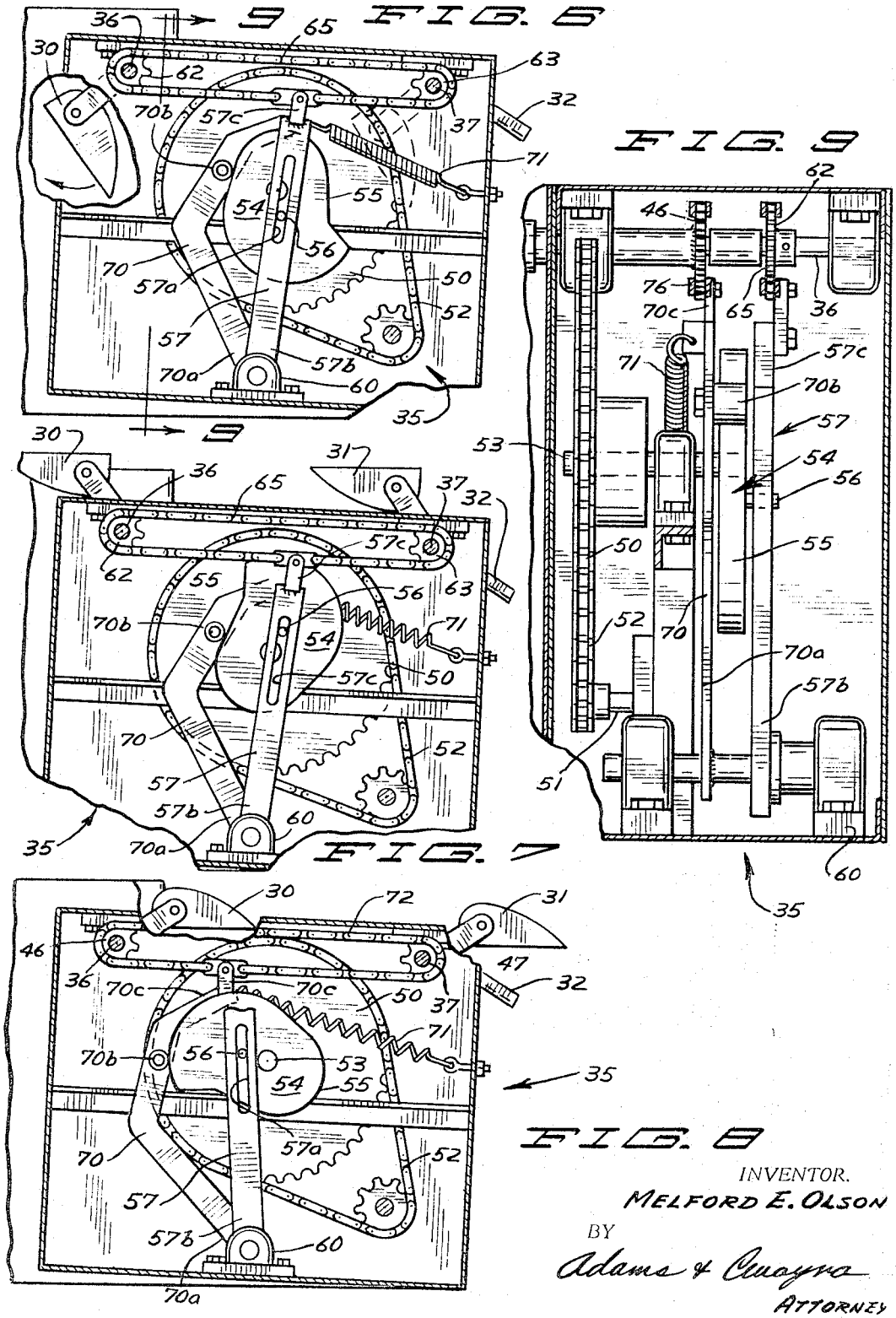

United States Patent Office 3,295,996
Patented Jan. 3, 1967

3,295,996
HONEYCOMB MELTER CLEANER
Melford E. Olson, 4749 Florida Ave., N.,
Minneapolis, Minn. 55427
Filed Oct. 22, 1965, Ser. No. 500,692
7 Claims. (Cl. 99—234)

This invention relates generally to honeycomb melting apparatus and more particularly to a device for automatically removing wax and slumgum from the honey melted from cappings and thereafter melting the slumgum and wax to produce final separation thereof to produce a particularly pure wax and finally removing the slumgum therefrom for disposal.

In the past various devices for extracting honey from honeycombs have been provided and many of these devices include automatic melting equipment to insure the proper removal of the honey and wax from honeycomb cappings. In processing honeycombs the most important product of course is the capping honey and it is particularly important in the process of melting cappings to maintain the cappings at a minimum heat which heat will insure the proper removal of the honey while not affecting the color and taste of the honey. If during the melting process the temperature of the extracting equipment is extremely high so as to raise the honey to a temperature over approximately 130° F., then the honey which is heated to this temperature will darken in color and will be affected in taste.

In the honeycomb melting operation the second most important product is the wax. It is most desirable in the removal and processing of wax to provide a clear pure wax which is free of impurities, the impurities of honeycomb cappings being referred to and being commonly known as slumgum.

The now available honeycomb melters general operation includes introducing cappings at one end of the unit and upon the application of heat the honey melts from the wax and settles to the bottom of the unit with the slumgum forming a layer directly thereabove with the wax floating above the slumgum. As the unit is filled with these products, the melted products tend to flow to one end of the unit where they are removed in their separated conditions. The ideal arrangement of course is to provide a continuous flow set up wherein a sufficient quantity of honeycomb cappings are continually fed into the melting unit and a continuous flow of honey and wax are taken from the other end of the unit. In order to provide this continuous melting operation it is essential to continually remove the accumulation of slumgum from the unit such that a back-up of slumgum will not occur. Up until the present time this slumgum removal has been primarily a manual operation and it has been necessary to provide various slumgum trapping baskets which require periodic cleaning in order to insure a proper flow of pure wax and honey from the unit.

In order to provide the honey and wax in their most pure condition the slumgum removal must as stated be continuous and it is likewise most desirable to have a maximum amount of honey removed from the unit before additional heat is applied to the mixture.

In the apparatus as provided herein applicant affords means wherein a maximum amount of honey will be processed at a sufficiently low temperature so as not to be damaged due to exposure to excessive heat and wherein the wax, a certain minimal portion of honey and the slumgum will be subsequently exposed to an area of extreme or relatively extreme heat which will insure the complete separation of the wax from the slumgum such that the wax may be recovered from the melter in its purest conditions.

In order to afford this unique operation, applicant provides a dual compartmented melting unit wherein a high percentage of honey is retrieved from the first melting compartment and the wax, slumgum and a small percentage of honey is transferred to a second compartment wherein the final purifying process is completed. In this second compartment a relatively extreme heat applied to the mixture serves to remove all of the slumgum from the wax to permit recovery of the wax in a purified condition and wherein the slumgum is automatically removed from the unit and is transferred to a container for disposal.

In order to provide a transfer mechanism from the first compartment to the second compartment and from the second compartment to the slumgum disposal area, applicant provides a new and unique actuating mechanism for a set of shovel or scope members which are carried during the transfer process in a controlled attitude to prevent tipping of any of the ingredients of the scoops.

The operation of this transfer mechanism is so designed so as to be substantially continuous with the operation of the melting unit such that no manual cleaning operations are necessary. Rather the transfer mechanism is cycled to coordinate with the amount of honey being produced and thereby insure the continuity of operation.

To afford the proper transfer of the products application has provided a unique driving mechanism to positively control the attitude of the scoops or buckets at all times thereby insuring positive transfer of material into and out of the various compartments. In order to provide this unique transfer mechanism applicant has provided a double action device which will control the position of the buckets or scoops and secondly control the attitude of the buckets or scoops through their entire range of positions from compartment to compartment. This of course controls the scooping and dumping action which is important to the operation of the unit to insure a quantity of material delivered from and into the compartments.

It is therefore an object of applicant's invention to provide a new and unique honeycapping melter including a pair of product melting compartments including a first compartment for initially removing a high percentage of the honey at a temperature that will not harm or destroy the taste or color of the honey and to provide a second compartment for further melting of the remaining products including the wax and slumgum to insure purification of the wax before removal thereof from the unit.

It is a further object of applicant's invention to provide a new and unique transfer mechanism for transferring quantities of products between compartments of a honeycapping melter such that manual operations are eliminated and which mechanism will afford substantially continuous operation of the melting unit.

It is a further object of applicant's invention to provide a transfer mechanism between compartments of a honeycapping melter which transfer units are controlled in not only their position but also in their attitude such that the scooping effect and delivery effect of the transfer mechanism is controlled at all times.

It is a further object of applicant's invention to provide a substantially automatic honey capping melter or the like devised to melt and separate the products of honeycomb cappings into various discharge areas and to insure the purification of the products before their removal.

These and other objects and advantages of my invention will more fully appear from the following description made in connection with the accompanying drawings, wherein like reference characters refer to the same or similar parts throughout the several views, and in which:

FIG. 4 is a vertical section taken substantially along line 4—4 of FIG. 2 particularly illustrating the drive mechanism for the transfer unit;

FIG. 5 is a horizontal section taken substantially along line 5—5 of FIG. 4;

FIG. 6 is a vertical section similar to FIG. 4 illustrating one position of the drive mechanism for the transfer device;

FIGS. 7 and 8 are views similar to FIG. 6 illustrating the drive mechanism of the transfer device in various positions;

FIG. 9 is a vertical section taken substantially along line 9—9 of FIG. 6 again illustrating the transfer drive mechanism.

Figure 1:
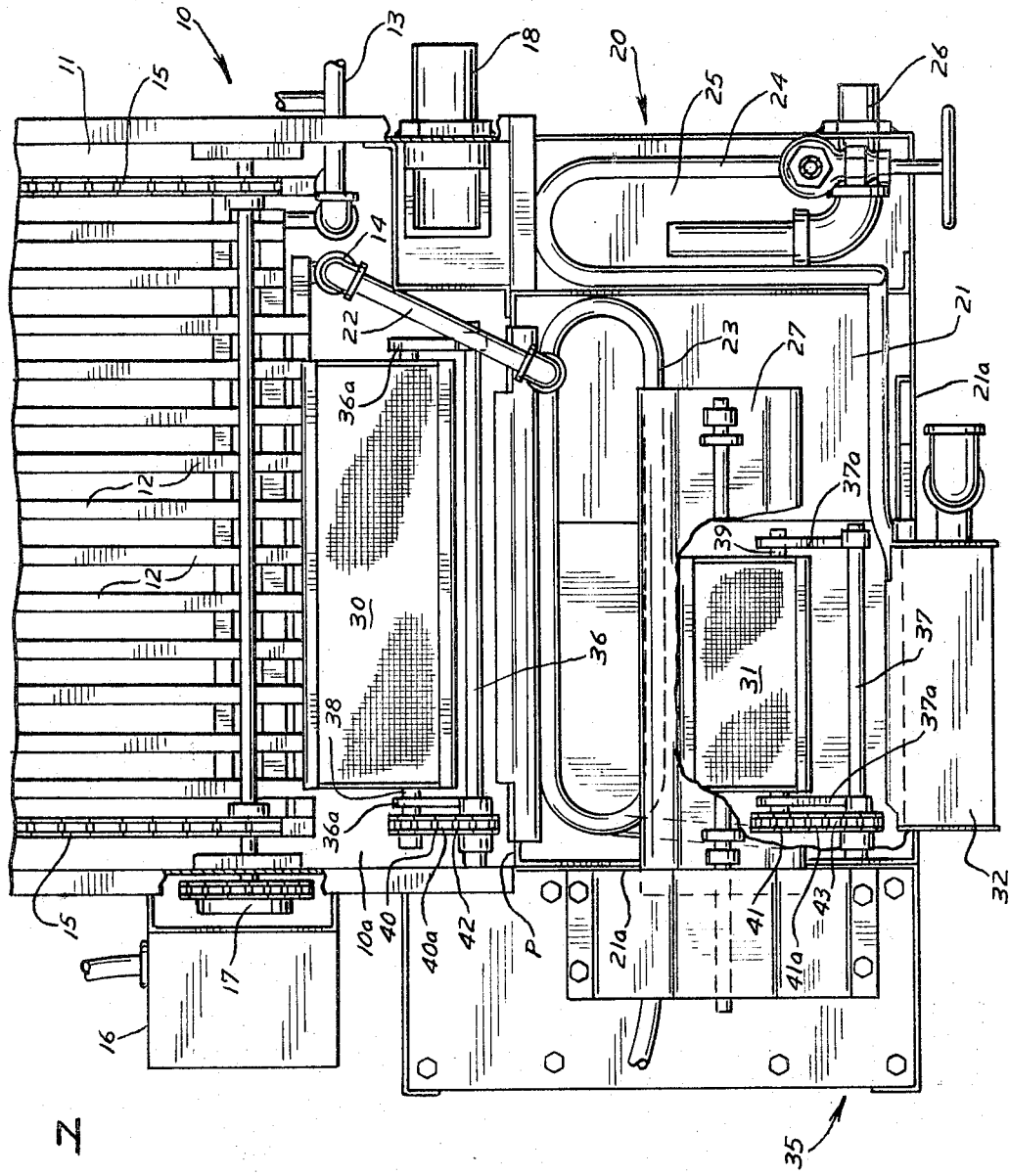
FIG. 1 is a partial plan view of a honeycomb melter incorporating the melting compartment and transfer mechanism of applicant's invention and having a portion thereof broken away to particularly illustrate one of the transfer mechanisms.

As illustrated in the accompanying drawings and as most thoroughly illustrated in FIG. 1, a honey capping melting device designated in its entirety 10 includes the honey melting and recovery portion designated 11 which is essentially a tank structure having a plurality of heating coils 12 arranged therein. These heating coils are heated through a steam medium or the like which may enter through an inlet conduit 13 and exit from the heating coil structure 12 through an outlet 14. In the form shown, where the additional features of applicant's device are not incorporated into the unit, the outlet 14 would discharge the steam from the coil or return the steam to the boiler.

In operation of this honey recovery portion of the unit, in the form shown a pair of drive chains 15—15 are provided parallel to the heating coils 12 and are arranged for driving a plurality of raking structures (not illustrated), along the coils to insure flow of products from the inlet or receiving end of the capping melter 10 which end is not illustrated to the discharge or product end which end is designated 10a. These rakes are driven through a motor 16 and chain drive mechanism 17.

The principle of the honeycomb melter as thus described is to receive cappings cut from honeycombs which cappings include honey in a free flowing state and honey entrapped within wax and slumgum and to melt the wax and slumgum composition to properly release the honey therefrom which heating is obtained through contact with the heating coils 12. It is essential in the heating of these cappings that the honey never reach a temperature over approximately 130° F. for at this temperature the honey will darken and a definite taste will develop in the honey.

Figure 2:
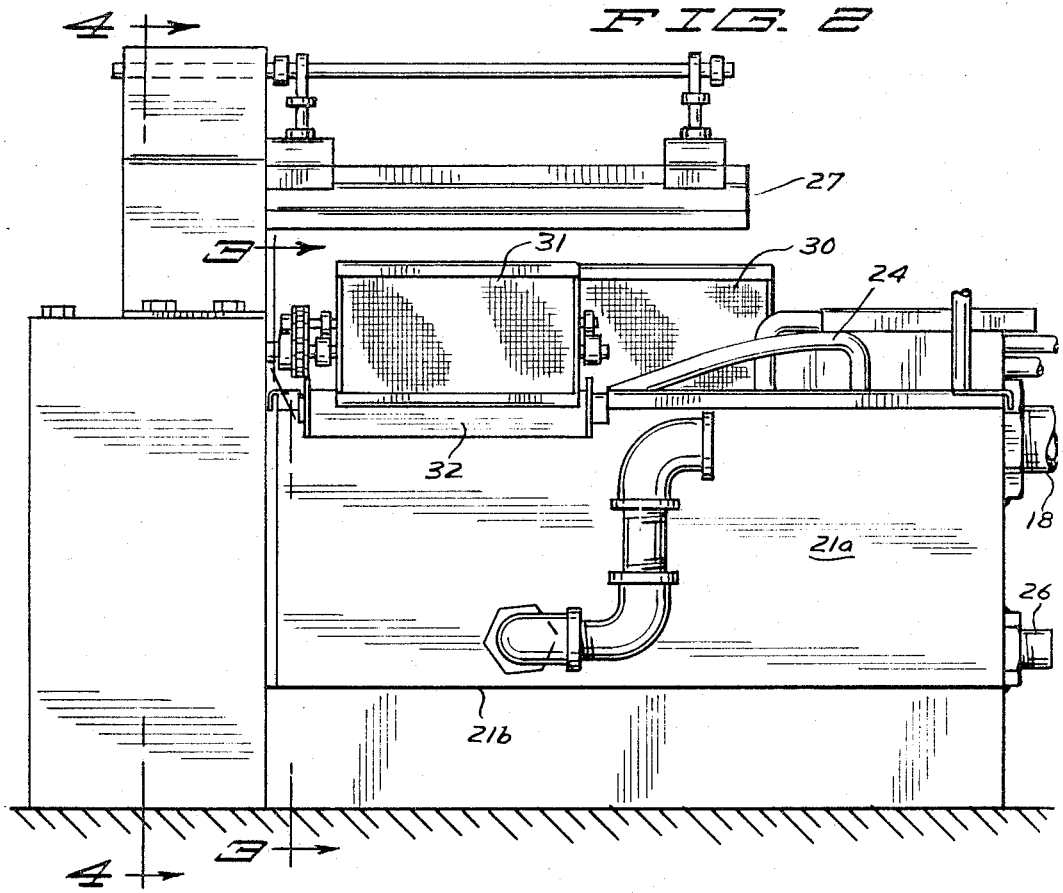
FIG. 2 is an end view of the unit illustrated in FIG. 1.

As the cappings are melted the products will, due to their specific gravities, position themselves with melted honey at the lower portion of the melter device 10 with the slumgum layer directly thereabove with the wax layer floating over the slumgum layer. To drain the properly melted honey an outlet is arranged to receive honey from the lower portion of the tank 10 which outlet is designated 18 and is illustrated in FIG. 2. By recovering the honey at the opening 18 which opening is received into the lower portion of the melting tank 10, only the honey which is then melted from the cappings at the proper temperature is recovered. With the device as incorporated by applicant, this recovered honey will be the greater percentage of the available honey and it is only that honey which will be moved into the melting compartment and that honey which may be at the uppermost portion of its individual layer which may be damaged through exposure to additional high heat.

In the form shown an additional melting compartment and melting attachment generally designated 20 is provided on the discharge end of applicant's melter unit 10. This melting compartment 20 defines a tank structure 21 having upstanding sides 21a and a bottom designated 21b to provide a compartment for receiving wax and slumgum therein. In the form shown the steam discharge outlet formly referred to as 14 continues into this compartment 21 through conduit 22 and provides a heating coil arrangement 23 within compartment 21 and the steam received from the melting section 12 of the primary melting compartment 11 is delivered thereto for additional heating in this melting compartment 21. After passing through this melting compartment coil 23 the steam may be discharged through conduit 24 which conduit will also pass through and around a wax reservoir section 25 within compartment 21 such that the wax is kept and maintained in a flowable condition for discharge through a conduit 26 into wax forming containers or the like. At this point it should be noted that this wax outlet 26 will be at the lower portion of the compartment 21 such that the slumgum will have been removed therefrom and only the purified wax will be recovered from the unit.

For efficiency of melting the slumgum and the wax and providing proper separation therefrom, a heater element 27 is provided directly overlying the melting compartment 21 and in actuality the overhead heater which in the form shown is an electric heat substantially "frys" the wax out of the slumgum as it is carried directly therebelow by the various transfer devices or baskets. At this point it should be noted that the application of additional heat will not cause any damage as the major portion of the honey has previously been removed before the transfer of wax and slumgum to this compartment.

Until the incorporation of applicant's additional melter device 21 into honeycomb melters it was necessary to provide a slumgum removal basket within the cavity 11 and this basket was generally on the product delivery end of the coil structure 12 such that as the products flowed thereacross the slumgum, wax and honey would pass through the basket and the slumgum would be retained on the basket itself. Substantially this position is illustrated by a first basket device generally designated 30. This basket is in the form of a scoop or the like and although positioned in the same position as the original slumgum baskets the function of this basket 30 is to transfer slumgum and wax from the honey melting compartment 11 to the additional heating compartment 21. After the slumgum and wax and a small percentage of honey has been transferred to this additional heating compartment 21, a second basket 31 is provided in this additional heating compartment 21 which functions to remove the slumgum from the wax after the final separation thereof for disposal through a chute 32 or the like such that it may be disposed of in a convenient container.

In order to provide proper dipping and transfer of the products from the first honey melting compartment 11 into the heating compartment 21 and thence from the heating compartment 21 to the chute 32 for disposal of slumgum, the basket structures 30 and 31 are positively controlled in their positions and attitudes throughout their entire travel from and into the compartments. The general idea involved in this positioning and control mechanism is to scoop and maintain after scooping the buckets in a horizontal position such that they will retain all of the material scooped therein without spilling during the transfer process. Once the transfer process is complete which is to say that once the buckets are positioned over their discharge position, the buckets are tipped to discharge the material into the respective areas. On the rearward translation of these buckets the idea is to substantially reverse the movement but to further provide an action wherein the frontmost portion of the bucket will descend into the material before the other portions of the bucket such that a minimum of agitation will result. This is particularly important in the honey portion 11 as the honey will not be disturbed and remix with the slumgum and wax.

The structure controlling the motion of the transfer baskets 30–31 is similar for each of the baskets and includes a common driving device which driving device is designated in its entirety 35. Each of the baskets 30–31 is provided with a first mounting spindle designated respectively 36–37 which spindle extends outwardly through the side of the respective compartments into the driving section 35. Arranged on each of these support rods 36–37 is a pair of longitudinally spaced arm elements designated 36a–36b, 37a–37b. These rod elements 36a–37a are attached to the support members 36–37 and rotate therewith. The baskets 30–31 are mounted between the rod elements 36a–37a on a second spindle member 38–39 which spindle member is rotatable with respect to the individual rod members 36a–37a. In this manner the baskets are free to rotate about the respective spindles 38–39 but are driven around the rods 36–37 upon rotation of said rods 36–37.

To provide for rotation of the baskets 30–31 and control the attitude thereof about the individual mounting rod members 38–39, a chain and sprocket arrangement which includes sprockets 40–41 attached to rods 38–39 and second sprockets designated 42–43 attached to cylindrical tube members 44–45 received about the respective support rods 36–37 is provided. On the other end of said cylindrical members 44–45 third sprockets 46–47 are fixedly attached such that upon rotation of sprockets 46–47 sprockets 42–43 will rotate therewith and the rotation is transmitted to sprockets 40–41 through chain structures 40a–41a. At this point it should be obvious that it is possible to maintain the attitude of the buckets 30–31 by proper control of the sprocket and chain structure recited which the baskets 30–31 are rotated about their respective first support rods 36–37 through the rotation thereof.

The particular drive structure designated 35 is illustrated in FIGS. 4–9, however, the placement of the individual mechanisms of drive mechanism 35 is best illustrated in FIGS. 5 and 9 and as illustrated herein a first drive wheel 50 is provided which drive wheel is initially driven through a motor 51 and chain arrangement 52 such that this drive fly wheel 50 will rotate at a speed of 1 r.p.m. Arranged on a central shaft 53 of the fly wheel 50 which central shaft 53 is supported for proper rotation of the fly wheel 51, is a cam structure 54 which cam structure is a double cam arrangement and includes a roller-follower cam and a pin link cam combined into one operating cam.

This combined cam mechanism 54 includes a specifically designed camming surface 55 about the periphery thereof and a central pin cam 56 arranged eccentrically to the shaft 53. This eccentric arrangement pin cam 56 provides in unison with a cam link 57 the motion to the first support shafts 36–37. The camming surface of link 57 is, as illustrated, a slot 57a with one end of the link 57b attached for rotation to a support frame 60 of the drive mechanism 35 for rotation thereabout. As cam 54 rotates, the eccentrically arranged pin 56 received within the slots 57a of link 57 will cause an oscillation of the link 57 and this oscillation will be transmitted to the first of the support shafts 36–37 controlling the first position of the buckets 30–31. This type of cam arrangement is of course well known in the art and as the cam 54 rotates, link 57 will oscillate through an angular relation about its rotatably mounted end 57b.

In order to transmit this oscillatory motion to the rotation of the first shafts 36–37 a pair of sprockets 62–63 are fixedly attached to the first of said shafts 36–37 with a chain member 65 provided to encircle the sprockets 62–63 which is attached to the other end 57c of the link 57. In this form as the link 57 is oscillated through action of the pin 56 on cam 54 the oscillation will be transmitted into rotation of the rod members 36–37 and it is this specific rotation which shifts the position of buckets 30–31 from compartment to compartment. Naturally when the link 57 completes its oscillation it will return the buckets 30–31 into the proper starting compartment.

The attitude control for buckets 30–31 is controlled through the peripheral shape 55 of cam 54 and is provided through a second link member 70 which link member is rotatably mounted at one end 70a thereof to a portion of the frame 60 and is provided with a roller member 70b intermediate its length which roller member is cammed upon the camming surface 55 of cam 54. This link member 70 is held in positive contact with the cam surface 55 through the addition of spring element 71 attached to the upper end 70c of said link 70. In the form shown the motion of this link 70 is transmitted to control the attitudes of the buckets 30–31 through another chain arrangement 72 encircling the sprockets 46–47 and which chain 72 is attached to the upper end 70c of the link 70. The motion of this link 70 is again an oscillatory motion which motion is particularly designed to control the attitudes of the individual buckets 70–71.

Figure 3:
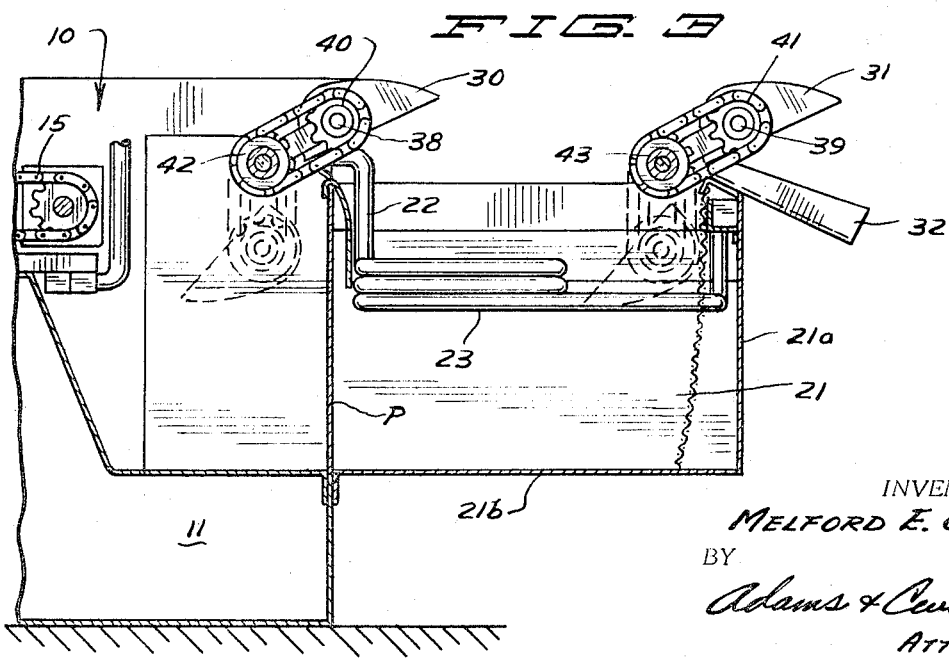
FIG. 3 is a vertical section taken substantially along line 3—3 of FIG. 2 illustrating the transfer mechanism and the melting compartment.

The motion of the buckets 30–31 as illustrated in these figures would place the position of the buckets as illustrated in FIG. 6 as the returning position in which the buckets are being returned into their respective compartments. As illustrated in FIG. 6 bucket 30 is being placed into the liquid level of the honey melting compartment having the forwardly extending portion move downwardly into the material contained therein such that a minimum amount of agitation will be afforded to such material. As the material bucket 30 starts its upward scooping motion the bucket 30 will start from a substantially vertical position and continue in the direction as illustrated by the arrow of FIG. 6. This vertical attitude will have been shifted to a substantially horizontal attitude at approximately the time the bucket 30 or 31 leaves the liquid level within the compartment. The bucket will be maintained at this horizontal attitude until the same is passed from its respective starting compartment. In the case of the bucket 30 this horizontal attitude will be maintained until the bucket passes over the partition designated P and for the bucket 31 this horizontal position will be maintained until the bucket passes over the most rearward side of the melting compartment 21. At this time the buckets 30, 31 will be substantially shifted into a position as illustrated in FIG. 3 and this position will be shifted until the position illustrated in FIG. 8 is obtained at which time the bucket is completely inverted and the material contained therein is completely dumped therefrom.

On the return of the buckets to their respective compartments the attitude is not necessarily horizontal but the buckets 30, 31 will be tipped from their inverted position of discharge to the position as shown in FIG. 6 which attitude shifting is substantially a continuous motion due to shape of the cam 55. This continuous motion then presents a smooth rotatable movement of the bucket abouts its rotative axis 38–39 and likewise about the first support axis 36–37.

As the buckets filled with their respective materials are passed in the horizontal position as illustrated in FIG. 7 from compartment to compartment, they will substantially pass under the electric heater 27 and as they pass thereunder the overhead heater literally frys the wax out of the slumgum such that when the wax and slumgum reach the compartment 21 the separation process will be substantially completed.

This shifting and transfer process of the material as previously stated continues throughout the entire time of use of the machine although switching mechanisms and energizing mechanisms may be provided to periodically energize this unit as well. This continuous transfer process of course provides and affords continuous operation of the melting device without any manual attention. The continuous operation also insures the proper flow of the wax and slumgum from the honey confining compartment and this continuous flow permits the amount of material fed into the receiving end of the hopper to be continually supplied. If the material were not continuously moved and transferred there would be a possibility of a backup of the wax and slumgum which would force the level of honey downwardly and could possibly cause the wax and slumgum to flow out of the honey discharge opening.

The drive unit as provided herein is a new and unique device which incorporates a transfer mechanism as well as an attitude control mechanism for a transfer bucket in a honeycomb melter and this device is unique in its application to a honeycomb melter.

It will, of course, be understood that various changes may be made in the form, details, arrangements and proportion of parts without departing from the scope of the invention, which generally stated consists in the matter set forth in the appended claims.

What I claim is:

1. A honeycomb capping separator for recovering honey, beeswax and other products comprising:
    (a) a separating tank to receive honeycomb cappings therein with means for supplying heat to the cappings to produce an initial separation of the products contained in the cappings;
    (b) a heating tank aranged to receive at least partially separated products therein from said separating tank;
    (c) heat supplying means in said heating tank to separate and purify the products delivered thereto to permit the recovery of beeswax in a purified condition; and
    (d) means for selectively transferring products from said first separating tank into said heating tank.

2. A honeycomb capping separator for recovering honey, beeswax and other products comprising:
    (a) a separating tank to receive honeycomb cappings therein with means for supplying heat to the cappings to produce an initial separation of the products contained in the cappings;
    (b) a heating tank arranged in receiving relation to said separating tank to receive at least selected products therein with first means therein for the application of additional separating heat thereto;
    (c) selectively controllable transfer means arranged to select certain of the products from said separating tank for delivery thereof into said heating tank; and
    (d) means for recovering from said heating tank purified beeswax and means for disposing of impurities from said heating tank.

3. The structure set forth in claim 2 wherein said transfer means includes scooping apparatus arranged to select products from said separating tank and direct said products into said heating tank for continued separation thereof.

4. The structure set forth in claim 3 wherein said first heating means is arranged within said heating tank and a second heat source is arranged in overlying relation to said transfer means for the application of separating heat to the materials conveyed in said transfer means.

5. The structure set forth in claim 2 wherein said transfer means includes scoop apparatus for delivering certain of said products from said separating tank to said heating tank and scoop like apparatus for selectively removing certain of said products from said heating tank for disposal thereof.

6. The structure set forth in claim 5 wherein said scoop like apparatus includes a pair of bucket members arranged to select products from said separating tank for delivery into said heating tank and from said heating tank for disposal, said buckets being provided with control means for positive attitude control throughout the transfer process to prevent spilling of the products being transferred.

7. The structure set forth in claim 6 wherein said transfer control includes means for rotating said buckets about a stationary axis and wherein said buckets are mounted for rotation independent of said stationary axis with control means thereon for positively controlling the attitude thereof with respect to said stationary axis.

References Cited by the Examiner
UNITED STATES PATENTS

| 1,327,166 | 1/1920 | Mitchell | 99—146 |
| 1,474,865 | 11/1923 | Vollmer et al | 210—361 |
| 1,565,471 | 12/1925 | Kuykendall | 99—146 |
| 1,636,719 | 7/1927 | Somerford | 99—146 |
| 2,844,253 | 7/1958 | Everett | 99—146 |

WALTER A. SCHEEL, *Primary Examiner.*

R. W. JENKINS, *Assistant Examiner.*